US008095733B2

(12) United States Patent
Arimilli et al.

(10) Patent No.: US 8,095,733 B2
(45) Date of Patent: Jan. 10, 2012

(54) VIRTUAL BARRIER SYNCHRONIZATION CACHE CASTOUT ELECTION

(75) Inventors: Ravi K. Arimilli, Austin, TX (US); Guy L. Guthrie, Austin, TX (US); Michael Siegel, Raleigh, NC (US); William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 12/419,343

(22) Filed: Apr. 7, 2009

(65) Prior Publication Data

US 2010/0257316 A1 Oct. 7, 2010

(51) Int. Cl.
*G06F 13/00* (2006.01)
*G06F 13/28* (2006.01)

(52) U.S. Cl. ........ 711/119; 711/120; 711/121; 711/122; 711/124; 711/129; 711/152; 711/154; 711/167; 709/213; 709/212; 709/214; 709/216; 712/27; 712/28

(58) Field of Classification Search .................. 711/119, 711/120, 121, 122, 124, 129, 152, 154, 167
See application file for complete search history.

(56) References Cited

U.S. PATENT DOCUMENTS

| 5,615,350 | A | | 3/1997 | Hesson et al. | |
| 5,666,506 | A | | 9/1997 | Hesson et al. | |
| 5,721,921 | A | * | 2/1998 | Kessler et al. | 718/102 |
| 5,970,232 | A | * | 10/1999 | Passint et al. | 709/238 |
| 6,085,303 | A | * | 7/2000 | Thorson et al. | 712/16 |
| 6,216,174 | B1 | * | 4/2001 | Scott et al. | 713/375 |
| 6,230,252 | B1 | * | 5/2001 | Passint et al. | 712/12 |
| 6,343,348 | B1 | | 1/2002 | Tremblay et al. | |
| 6,643,763 | B1 | | 11/2003 | Starke et al. | |
| 6,654,946 | B1 | * | 11/2003 | Eneboe et al. | 716/104 |
| 6,691,220 | B1 | | 2/2004 | Guthrie et al. | |
| 6,748,518 | B1 | | 6/2004 | Guthrie et al. | |
| 6,751,698 | B1 | * | 6/2004 | Deneroff et al. | 710/317 |
| 6,963,967 | B1 | | 11/2005 | Guthrie et al. | |
| 7,065,672 | B2 | * | 6/2006 | Long et al. | 714/11 |
| 7,100,021 | B1 | * | 8/2006 | Marshall et al. | 712/19 |

(Continued)

OTHER PUBLICATIONS

Berekovic et al; A Scalable, Clustered SMT Processor for Digital Signal Processing; ACM SIGARCH Computer Architecture News; vol. 32, No. 3, Jun. 2004, pp. 62-69.

(Continued)

*Primary Examiner* — Viet Nguyen
(74) *Attorney, Agent, or Firm* — Yudell Isidore Ng Russell PLLC

(57) ABSTRACT

A data processing system includes an interconnect fabric, a system memory coupled to the interconnect fabric and including a virtual barrier synchronization region allocated to storage of virtual barrier synchronization registers (VBSRs), and a plurality of processing units coupled to the interconnect fabric and operable to access the virtual barrier synchronization region. Each of the plurality of processing units includes a processor core and a cache memory including a cache controller and a cache array that caches VBSR lines from the virtual barrier synchronization region of the system memory. The cache controller of a first processing unit, responsive to a memory access request from its processor core that targets a first VBSR line, transfers responsibility for writing back to the virtual barrier synchronization region a second VBSR line contemporaneously held in the cache arrays of first, second and third processing units. The responsibility is transferred via an election held over the interconnect fabric.

15 Claims, 8 Drawing Sheets

U.S. PATENT DOCUMENTS

| | | | |
|---|---|---|---|
| 7,406,086 B2 | 7/2008 | Deneroff et al. | |
| 7,437,521 B1 * | 10/2008 | Scott et al. | 711/151 |
| 7,460,086 B1 * | 12/2008 | Cunningham et al. | 345/3.1 |
| 7,788,468 B1 * | 8/2010 | Nickolls et al. | 712/22 |
| 7,797,496 B2 * | 9/2010 | Gruber et al. | 711/147 |
| 2005/0120185 A1 | 6/2005 | Yamazaki et al. | |
| 2006/0101249 A1 | 5/2006 | Bacon et al. | |
| 2006/0225074 A1 | 10/2006 | Vaid et al. | |
| 2010/0257317 A1 | 10/2010 | Arimilli et al. | |

OTHER PUBLICATIONS

Prabhu, M., et al; Using Thread-Level Speculation to Simply Manual Parallelization; ACM; 2003; pp. 1-12.

Nguyen, Viet—Notice of Allowability dated Aug. 25, 2011; U.S. Appl. No. 12/419,364.

Raghavachari, M. et al; Ace: A Language for Parallel Programming With Customizable Protocols; ACM Transactions on Computer Systems, vol. 17, No. 3, Aug. 1999, pp. 202-248.

Fang, Z. et al; Active Memory Operations; ICS-2007, Seattle, WA, pp. 232-241, 2007.

Sampson, J. et al.; Exploiting Fine-Grained Data Parallelism with Chip Multiprocessors and Fast Barriers; IThe 39th Annual IEEE/ACM International Symposium on Microarchitecture (MICRO '06); 2006.

Yeung, D. et al; Multigrain Shared Memory; ACM Transactions on Computer Systems, vol. 18, No. 2, May 2000, pp. 154-196.

* cited by examiner

| V 262 | ttype 264 | address 266 | misc 268 |
|---|---|---|---|

PRIOR ART

| V 272 | ttype 274 | data 276a | address 278 | data 276b | misc 280 |
|---|---|---|---|---|---|

VIRTUAL BARRIER SYNCHRONIZATION CACHE CASTOUT ELECTION

This invention was made with United States Government support under Agreement No. HR0011-07-9-0002 awarded by DARPA. The Government has certain rights in the invention.

BACKGROUND OF THE INVENTION

1. Technical Field

The present invention relates generally to data processing, and in particular, to synchronization of processing in a data processing system. Still more particularly, the present invention relates to the virtualization of barrier synchronization registers in a data processing system.

2. Description of the Related Art

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of memory in the multiprocessor computer system directly addressable by the processing units and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from memory. In some multiprocessor (MP) systems, the cache hierarchy includes at least two levels. The level one (L1), or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then accesses lower-level caches (e.g., level two (L2) or level three (L3) caches) for the requested memory block. The lowest level cache (e.g., L3) is often shared among several processor cores.

In such conventional MP systems, large workloads can be dispatched efficiently by harnessing the processing power of multiple of the processing units to execute several program-managed threads or processes in parallel. The multiple threads or processes can communicate data and control messages through the shared memory hierarchy.

When input values for operations to be executed by some processing unit are results (i.e., output values) of the processing performed by other processing units within the shared memory multiprocessor environment, the processing of the data-dependent operations introduces additional complexity. For example, in order for the first processor to obtain the results to be utilized as input values, the second processor must first store the output values to the shared memory hierarchy so that the first processor may then retrieve the results from memory. In addition, the execution of instructions of the first and second processors must be synchronized to ensure that the first processor is accessing the appropriate results in the shared memory hierarchy and not some prior, stale data values. Conventionally, the synchronization of processing by multiple processing units is accomplished via a single mirrored architected hardware register known as a barrier synchronization register (BSR) within each processing unit. However, as recognized herein, the availability of only a single resource such as a BSR to synchronize multiprocessing operations limits the virtualizability of workloads.

SUMMARY OF THE INVENTION

In one embodiment, a data processing system includes an interconnect fabric, a system memory coupled to the interconnect fabric and including a virtual barrier synchronization region allocated to storage of virtual barrier synchronization registers (VBSRs), and a plurality of processing units coupled to the interconnect fabric and operable to access the virtual barrier synchronization region of the system memory. Each of the plurality of processing units includes a processor core and a cache memory including a cache array that caches VBSR lines from the virtual barrier synchronization region of the system memory and a cache controller. The cache controller, responsive to a store request from the processor core to update a particular VBSR line, performs a non-blocking update of the cache array in each other of the plurality of processing units contemporaneously holding a copy of the particular VBSR line by transmitting a VBSR update command on the interconnect fabric.

In one embodiment, a data processing system includes an interconnect fabric, a system memory coupled to the interconnect fabric and including a virtual barrier synchronization region allocated to storage of virtual barrier synchronization registers (VBSRs), and a plurality of processing units coupled to the interconnect fabric and operable to access the virtual barrier synchronization region. Each of the plurality of processing units includes a processor core and a cache memory including a cache controller and a cache array that caches VBSR lines from the virtual barrier synchronization region of the system memory. The cache controller of a first processing unit, responsive to a memory access request from its processor core that targets a first VBSR line, transfers responsibility for writing back to the virtual barrier synchronization region a second VBSR line contemporaneously held in the cache arrays of first, second and third processing units. The responsibility is transferred via an election held over the interconnect fabric.

BRIEF DESCRIPTION OF THE DRAWINGS

FIG. 2B depicts a conventional format of an address tenure of a command on the interconnect fabric of the data processing system of FIG. 1;

FIG. 2C illustrates an exemplary format of an address tenure of a VBSR command on the interconnect fabric of the data processing system of FIG. 1;

DETAILED DESCRIPTION OF ILLUSTRATIVE EMBODIMENT(S)

Figure 1:
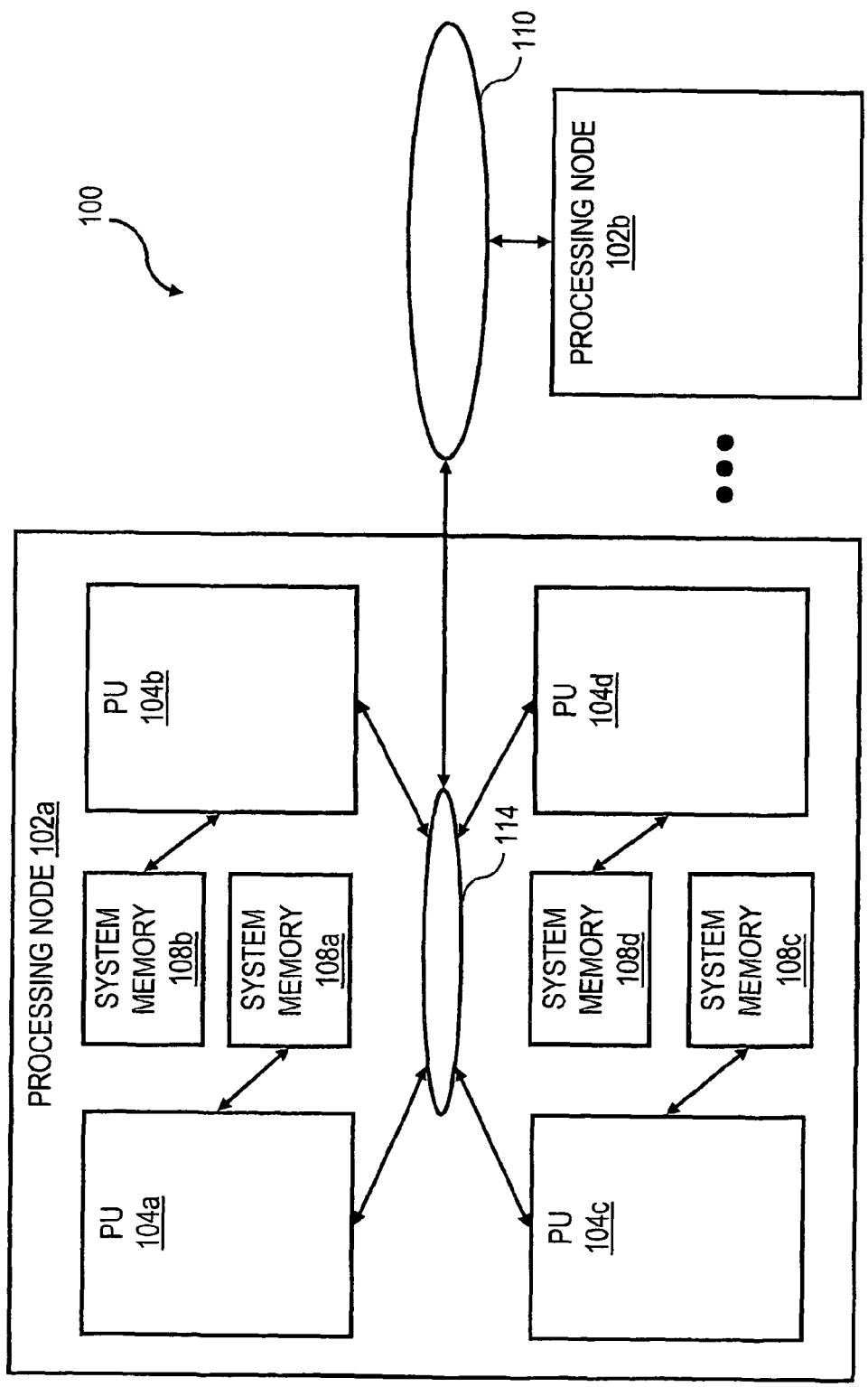
FIG. 1 is a high-level block diagram of an exemplary multiprocessor data processing system in one possible embodiment.

With reference now to the figures, wherein like reference numerals refer to like and corresponding parts throughout, and in particular with reference to FIG. 1, there is illustrated a high-level block diagram depicting an exemplary data processing system in which the present invention may be implemented. The data processing system is depicted as a cache coherent symmetric multiprocessor (SMP) data processing system 100. As shown, data processing system 100 includes multiple processing nodes 102a, 102b for processing data and instructions. Processing nodes 102 are coupled to a system interconnect 110 for conveying address, data and control (e.g., coherence) information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a single respective integrated circuit. The processing units 104 within each processing node 102 are coupled for communication to each other and system interconnect 110 by a local interconnect 114, which, like system interconnect 110, may be implemented, for example, with one or more buses and/or switches.

As described below in greater detail with reference to FIG. 2A, processing units 104 each include a memory controller 106 coupled to local interconnect 114 to provide an interface to a respective system memory 108. Data and instructions residing in system memories 108 can generally be accessed and modified by a processor core in any processing unit 104 of any processing node 102 within data processing system 100. In alternative embodiments of the invention, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2A:
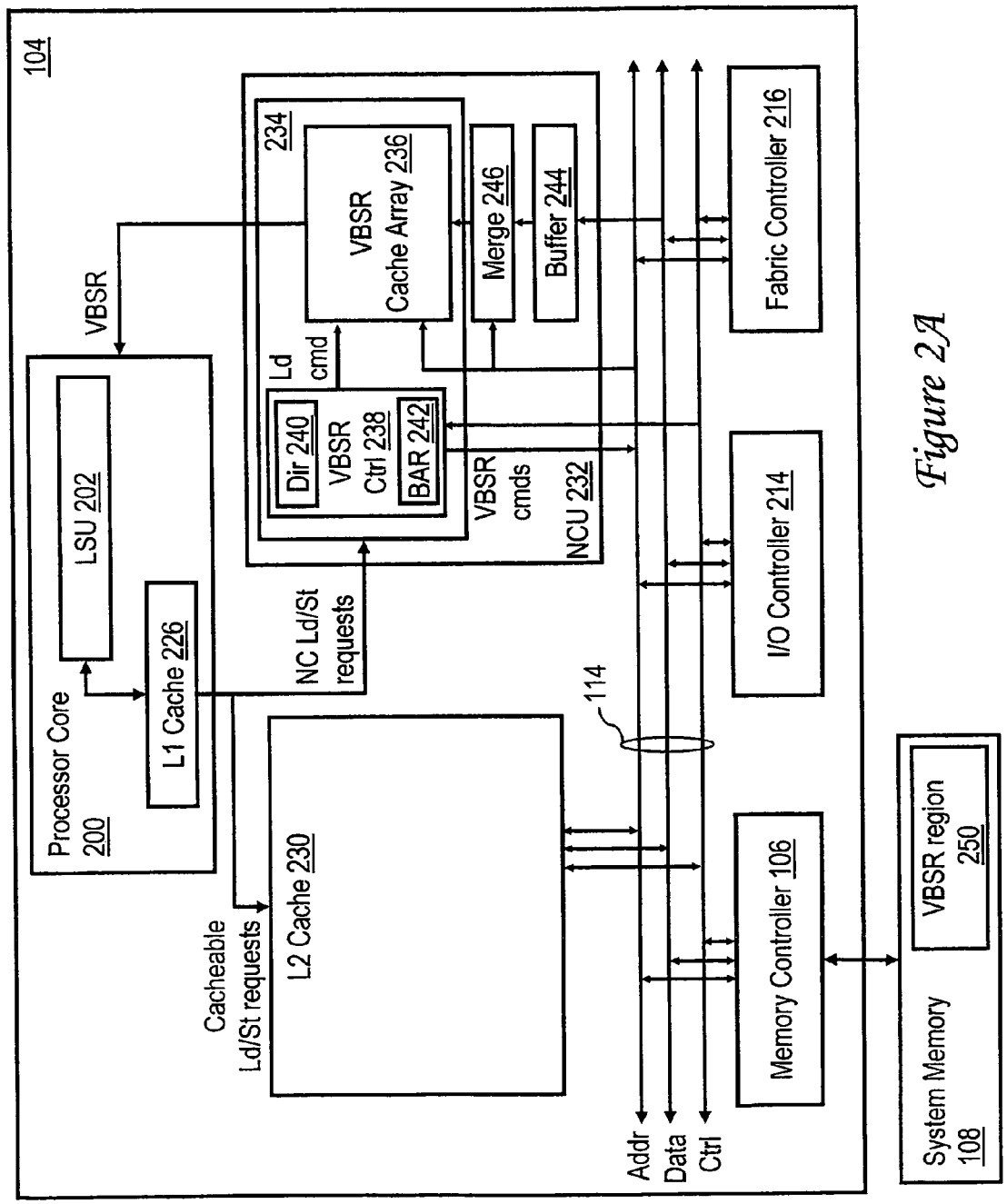
FIG. 2A is a more detailed block diagram of an exemplary processing unit in one possible embodiment.

Referring now to FIG. 2A, there is depicted a more detailed block diagram of an exemplary processing unit 104 in accordance with the present invention. In the depicted embodiment, each processing unit 104 includes at least one (and usually more) processor cores 200 for independently processing instructions and data. In one preferred embodiment, each processor core 200 supports multiple (e.g., two) concurrent hardware threads of execution. As depicted, each processor core 200 includes one or more execution units, such as load-store unit (LSU) 202, for executing or interpreting instructions within program code. The instructions executed or interpreted by LSU 202 include memory access instructions, such as load and store instructions, which request access to a memory block or cause the generation of a request for access to a memory block.

The operation of each processor core 200 is supported by a multi-level memory subsystem having at its lowest level shared system memory 108, and at its upper levels one or more levels of cache memory, which in the illustrative embodiment include a store-through level one (L1) cache 226 within and private to each processor core 200, and a respective store-in level two (L2) cache 230, which may be private or shared by multiple processor cores 200. In order to efficiently handle multiple concurrent memory access requests to cacheable addresses, L2 cache 230 may be implemented with multiple address-hashed cache slices, each handling memory access requests for a respective set of real memory addresses. Although the illustrated memory hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

The L1, L2 and lower level caches, if any, within the memory hierarchy employ a coherence protocol to maintain correctness in the presence of possibly concurrent accesses to shared storage locations in system memory 108 by multiple processing units 104. The coherence protocol can be, for example, the conventional MESI (Modified, Exclusive, Shared, Invalid) coherence protocol or a variant thereof.

Processing unit 104 further includes a non-cacheable unit (NCU) 232 that performs memory accesses to storage locations within system memory 108 that are non-cacheable in the traditional cache memory hierarchy utilized to cache instructions and data. As is well known in the art, non-cacheable storage locations in system memory 108 can be identified, for example, by reference to storage control bits in a page table residing in system memory 108. In the illustrated embodiment, the non-cacheable storage locations within system memory 108 include a virtual barrier synchronization register (VBSR) region 250 that is utilized to virtualize the physical barrier synchronization register (BSR) present within conventional processing units. That is, rather than each processing unit 104 being limited to a single physical BSR facility, as is known in the prior art, processing units 104 share an implementation-dependent number of software managed and synchronized virtual BSRs (VBSRs) ultimately residing in VBSR region 250 of system memory 108.

In one exemplary embodiment, each VBSR may have the length of one or more standard memory blocks ("lines") or individually accessible sub-block thereof, and the state of each byte or group of bytes of the VBSR indicates whether or not a respective associated software thread or process has completed its processing. For example, at the end of its computational instructions, each of a plurality of software threads or processes may include a store instruction targeting a target VBSR line within VBSR region 250. As each software thread or process concludes, a processor core 200 executes the store instruction in its LSU 202 to generate a non-cacheable store request, which is transmitted to NCU 232 in order to update the target VBSR, as described further below. By examining the contents of the target VBSR via a load instruction executed by the LSU 202 of a processor core 200, a master thread or process can synchronize the execution of data-dependent threads or processes.

To facilitate low latency access to the VBSRs, NCU 232 includes a VBSR cache 234 including a set-associative VBSR cache array 236 for temporarily caching lines of VBSRs retrieved from VBSR region 250 or sourced by another VBSR cache 234. VBSR cache 234 further includes a VBSR controller 238 that controls VBSR cache array 236. VBSR controller 238 includes a base address register (BAR) facility 242, which is programmed (e.g., at system startup) to indicate the real memory addresses belonging to VBSR region 250, and a directory 240 of the contents of VBSR cache array 234. For each VBSR line held in VBSR cache array 236, directory 240 specifies at least an address tag portion of the real memory address of the VBSR line and a coherence state. The coherence protocol for VBSR lines, which is preferably different from that utilized for cacheable memory blocks in L1 cache 226 and L2 cache 230, may include the exemplary coherence states set forth in Table I below.

TABLE I

| VBSR Coherence State | Copy of VBSR line present in this VBSR cache? | Copy of VBSR line present in any other VBSR cache? | This VBSR cache responds to updates to VBSR line? | This VBSR cache responds to snooped load request? | This VBSR cache responsible for writeback of the VBSR line to system memory? |
|---|---|---|---|---|---|
| Ib | No | Unknown | No | No | No |
| Sb | Yes | Yes | Yes | No | No |
| Tb | Yes | Unknown | Yes | Yes | Yes |

In the exemplary VBSR coherence protocol, if a VBSR line is cached at all, the single VBSR cache 236 that most recently acquired a copy of the VBSR line holds the VBSR line in the Tb state, and any other VBSR cache 234 within data processing system 100 sharing a copy of the VBSR line holds its respective copy of the VBSR line in the Sb state. The Tb state indicates that the associated VBSR cache 234 currently has the responsibility for sourcing a copy of the VBSR line in response to snooping a VBSR_Get command of another VBSR cache 236 and currently has the responsibility of writing back the VBSR line to system memory 108. It should be noted that all cached copies of any given VBSR line held in VBSR caches 236 throughout data processing system 100 are automatically synchronized without invalidation upon update of the VBSR line, as described further below.

Although the implementation of VBSRs in a non-cacheable memory region is not required by the present invention, it should be noted that doing so conveniently separates the handling of VBSRs from the data and command flow of the mainline cache hierarchy. Consequently, the handling of VBSRs is more easily implemented.

Still referring to FIG. 2A, in addition to processor core(s) 200, L2 cache 230, NCU 232 and memory controller 106, processing unit 104 further includes an integrated I/O (input/output) controller 214 supporting the attachment of one or more I/O devices (not depicted) and a distributed fabric controller 216 that controls communication on the interconnect fabric comprising local interconnects 114 and system interconnect 110. All of these circuits are coupled for communication to local interconnect 114.

With reference now to FIG. 2B, a conventional format for an address tenure 260 of a command on local interconnect 114 is depicted. As indicated, conventional address tenure 260, which may be transmitted, for example, by an L2 cache 230, includes a valid field 262 indicating whether or not the address tenure contains valid information, a transaction type (ttype) field 264 indicating the type of the command (e.g., cache line read, cache line write, cache line invalidation, etc.), a real memory address field 266 indicating a target real memory address of the command, and a miscellaneous field 268 optionally providing one or more additional parameters for the command.

As will be appreciated by those skilled in the art, conventional commands, for example, those issued by L2 caches 230, may also contain or entail a data transmission between L2 caches 230 and/or system memory 108 (e.g., a cache line requested by a cache line read or targeted by a cache line write). In such cases, the data is transmitted during a data tenure on local interconnect 114 that is typically subsequent to the address tenure.

Referring now to FIG. 2C, there is depicted an exemplary format of an address tenure 270 of a VBSR command issued by VBSR caches 234 on local interconnect 114. Exemplary address tenure 270 of a VBSR command includes a valid field 272 indicating whether or not the address tenure contains valid information, a transaction type (ttype) field 274 indicating the type of the VBSR command, a real memory address field 278 indicating a partial real memory address sufficient to identify a storage location within VBSR region 250, and an optional miscellaneous field 280 providing one or more additional parameters for the VBSR command.

In contrast to conventional address tenure 260, address tenure 270 of VBSR command also includes data fields 276a-276b, which are formed of bits of the address tenure made available by a reduction in the size of address field 278 versus conventional address field 266. Data fields 276a-276b are sized to collectively contain one or more bytes of a VBSR. Consequently, in a preferred embodiment, most of the VBSR commands, including a VBSR_Update command utilized to synchronize cached copies of a target VBSR line, utilize an address tenure on the interconnect fabric, but no separate data tenure. Thus, for implementations in which the interconnect fabric includes separate address and data paths (e.g., buses), VBSR caches 234 issue VBSR_Update commands on the address path and do not use the data paths. As a result, cached VBSRs can be synchronized in a non-blocking fashion in a single address tenure on the interconnect fabric, as described further below.

In an exemplary embodiment, the VBSR commands issued on the interconnect fabric by VBSR caches 234 include those set forth in Table II, below.

TABLE II

| VBSR Command | Data Tenure? | Description |
|---|---|---|
| VBSR_Get | Yes | Command that requests a copy of specified VBSR line |
| VBSR_Update | No, address-only | Command updates any cached copies of the specified VBSR line |
| VBSR_Probe | No, address-only | Command by a VBSR cache in the Tb state to initiate election of a VBSR cache in the Sb state, if any, to assume Tb state |
| VBSR_Tb_Claim | No, address-only | Command by a VBSR cache in the Sb state requesting permission to assume Tb state in response to receipt of a VBSR_Probe |

TABLE II-continued

| VBSR Command | Data Tenure? | Description |
| --- | --- | --- |
| VBSR_Claim_Done | No, address-only | Command issued by a newly elected VBSR cache in the Tb state to indicate that an election is over |
| VBSR_CO | Yes | Command by the single VBSR cache in the Tb state to write back a VBSR line to system memory |

Figure 3:
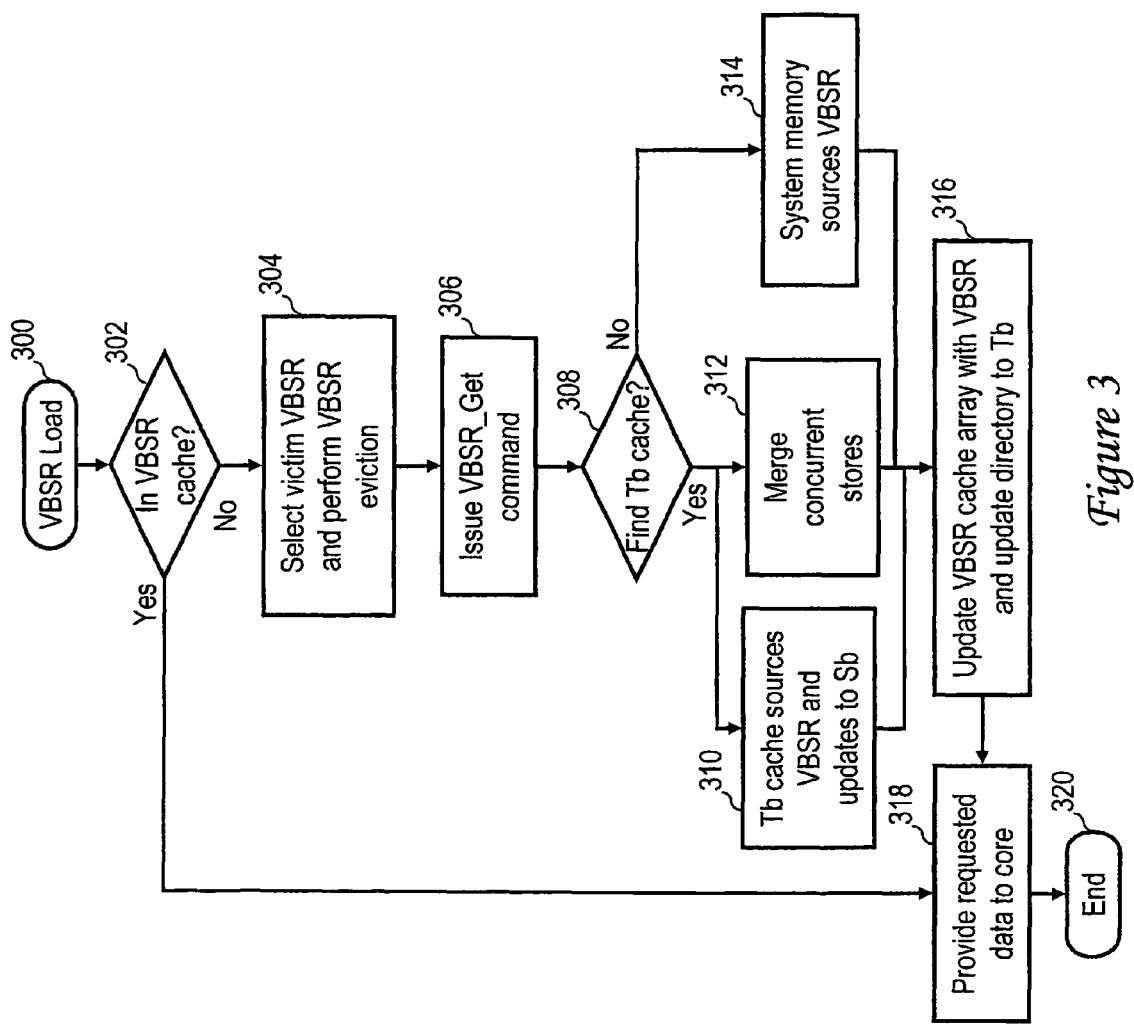
FIG. 3 is a high level logical flowchart of an exemplary process by which a VBSR load request of a processor core is serviced.

With reference now to FIG. 3, there is illustrated a high level logical flowchart of an exemplary process by which a VBSR load request of a processor core 200 is serviced. As with the other logical flowcharts described herein, the steps shown in FIG. 3 are ordered logically rather than strictly chronologically. Consequently, at least some of the illustrated steps may be performed in a different order than depicted or contemporaneously, as will be appreciated by those skilled in the art.

The illustrated process begins at block 300, following the execution of a load instruction targeting a real memory address associated with a VBSR line in VBSR region 250 by the LSU 202 of a processor core 200. Because the load instruction targets a non-cacheable real memory address (e.g., as indicated by page table access control bits), processor core 200 routes a non-cacheable load request to NCU 232. Upon receipt by NCU 232, VBSR controller 238 inspects the non-cacheable load request to determine by reference to BAR facility 242 whether the target real memory address of the non-cacheable load request falls within VBSR region 250 (i.e., whether or not the non-cacheable load request is a VBSR load request). If not, NCU 232 handles the non-cacheable load request in a possibly conventional manner (not illustrated). If, however, VBSR controller 238 determines that the non-cacheable load request is a VBSR load request that targets a VBSR line in VBSR region 250, VBSR controller 238 next determines by reference to directory 240 whether or not a valid copy of the target VBSR line currently resides in VBSR cache array 236 (block 302).

If so, VBSR controller 238 causes the requested VBSR line to be read out of VBSR cache array 236 and supplied to processor core 200 (block 318). If, however, VBSR controller 238 determines at block 302 that the VBSR load request misses in directory 240, VBSR controller 238 selects a victim VBSR line currently held in VBSR cache array 236 (e.g., the least recently used (LRU) entry of the relevant congruence class) and performs the VBSR eviction process described below with reference to FIG. 6 for the victim VBSR line (block 304). VBSR controller 238 also issues on local interconnect 214 a VBSR_Get command to obtain a copy of the target VBSR line (block 306). The VBSR_Get command is snooped by memory controllers 106 and VBSR caches 234, which provide coherence responses that are compiled to obtain a system coherence response. As indicated at blocks 308 and 314, if the system coherence response to the VBSR_Get command indicates that no VBSR cache 238 in data processing system 100 currently holds a copy of the target VBSR line in the Tb state, memory controller 106 of the relevant system memory 108 sources the target VBSR line to the requesting VBSR cache 234 (block 314). Thereafter, the process proceeds to block 316, which is described below.

Returning to block 308, if the system coherence response to the VBSR_Get command indicates that another VBSR cache 234 holds a copy of the target VBSR line in the Tb state, the VBSR cache 234 holding a copy of the target VBSR line in the Tb state sources a copy of the target VBSR line to the requesting VBSR cache 234 via a data tenure and updates its directory 240 to associate its copy of the target VBSR line with the Sb state (block 310). As indicated in FIG. 2A, the copy of the target VBSR line is received in NCU 232 within a buffer 244. Prior to an update of VBSR cache array 236, merge logic 246 in NCU 232 merges into the buffered copy of the target VBSR line any in-flight changes to the target VBSR line reflected in data fields 276a-276b of the address tenures of VBSR_Update commands issued by other VBSR caches 234 (block 312). As indicated at block 316, the target VBSR line, as updated by the data fields 276 of any merged VBSR_Update commands, is then placed in VBSR cache array 236, and VBSR controller 238 updates the corresponding entry in directory 240 to the Tb state. VBSR controller 238 also causes the requested VBSR line to be read out of VBSR cache array 236 and supplied to processor core 200 (block 318). Thereafter, the process depicted in FIG. 3 terminates at block 320.

Figure 4:
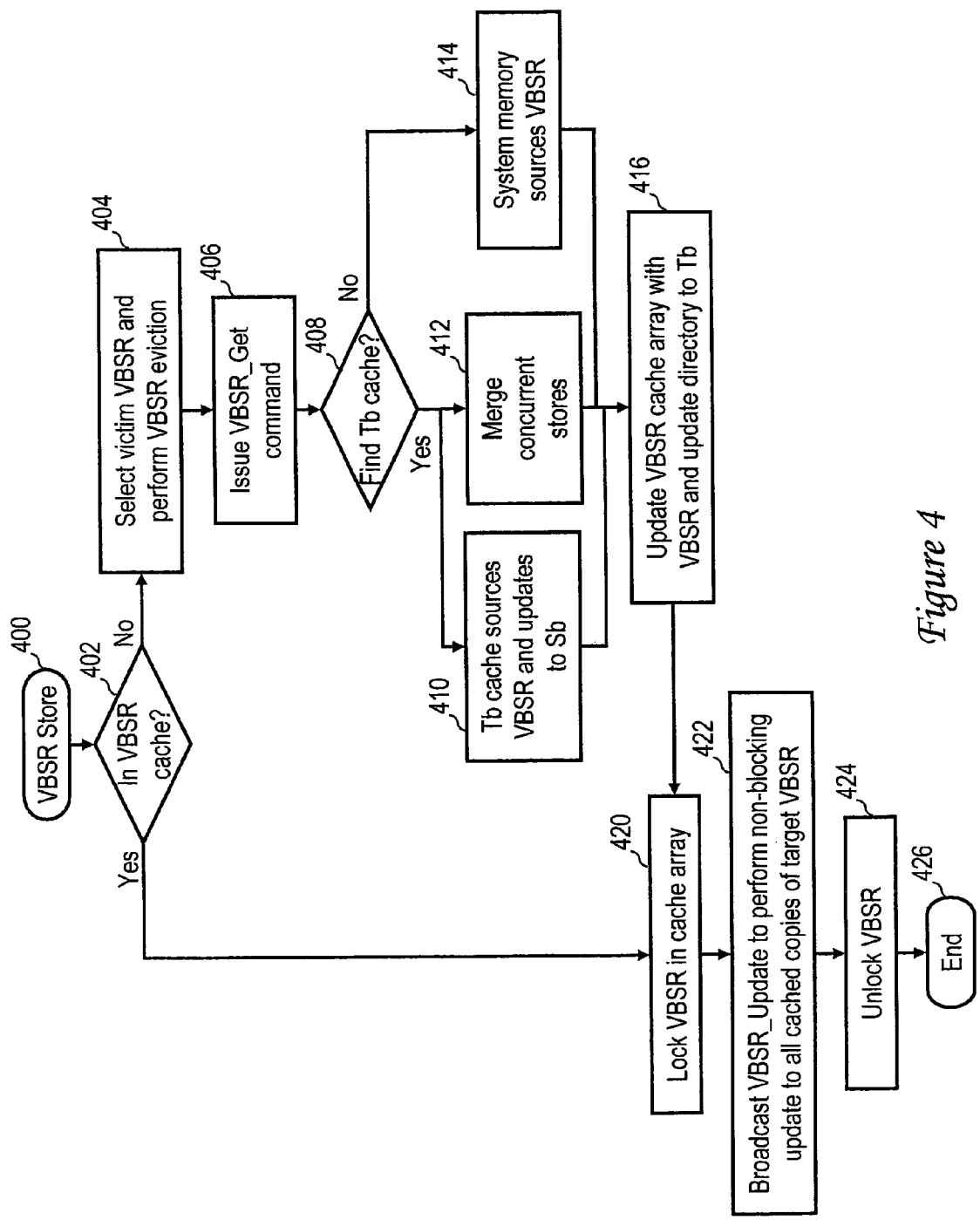
FIG. 4 is a high level logical flowchart of an exemplary process by which a VBSR store request of a processor core is serviced.

Referring now to FIG. 4, there is depicted a high level logical flowchart of an exemplary process by which a VBSR store request of a processor core 200 is serviced. The process begins at block 400, following the execution of a store instruction targeting a real memory address associated with a VBSR line in VBSR region 250 by LSU 202 of a processor core 200. Because the store instruction targets a non-cacheable real memory address (e.g., as indicated by page table access control bits), processor core 200 routes a non-cacheable store request to NCU 232. Upon receipt by NCU 232, VBSR controller 238 inspects the non-cacheable store request to determine by reference to BAR facility 242 whether the target real memory address of the non-cacheable store request falls within VBSR region 250 (i.e., whether or not the non-cacheable store request is a VBSR store request). If not, NCU 232 handles the non-cacheable store request in a possibly conventional manner (not illustrated). If, however, VBSR controller 238 determines that the non-cacheable store request is a VBSR store request that targets a VBSR line in VBSR region 250, VBSR controller 238 next determines by reference to directory 240 whether or not a valid copy of the target VBSR line currently resides in VBSR cache array 236 (block 402).

If so, the process passes from block 402 to block 420, which is described below. If, however, VBSR controller 238 determines at block 402 that the VBSR store request misses in directory 240, VBSR controller 238 selects a victim VBSR line currently held in VBSR cache array 236 (e.g., the least recently used (LRU) entry of the relevant congruence class) and performs the VBSR eviction process described below with reference to FIG. 6 for the victim VBSR line (block 404). VBSR controller 238 also issues on local interconnect 214 a VBSR_Get command to obtain a copy of the target VBSR line (block 406). The VBSR_Get command is snooped by memory controllers 106 and VBSR caches 234, which provide coherence responses that are compiled to obtain a system coherence response. As indicated at blocks 408 and 414, if the system coherence response to the VBSR_Get command indicates that no VBSR cache 234 in data processing system 100 currently holds a copy of the target VBSR line in the Tb state, memory controller 106 of the relevant system memory 108 sources the target VBSR line to the requesting VBSR cache 234 (block 414). Thereafter, the process proceeds to block 416, which is described below.

Returning to block 408, if the system coherence response to the VBSR_Get command indicates that another VBSR cache 234 holds a copy of the target VBSR line in the Tb state, the VBSR cache 234 holding a copy of the target VBSR line in the Tb state sources a copy of the target VBSR line to the requesting VBSR cache 234 via a data tenure and updates its directory 240 to associate its copy of the target VBSR line with the Sb state (block 410). The copy of the target VBSR line sourced by the former Tb cache is received in NCU 232 within buffer 244. Prior to an update of VBSR cache array 236, merge logic 246 in NCU 232 merges into the buffered copy of the target VBSR line any in-flight changes to the target VBSR line reflected in data fields 276a-276b of the address tenures of VBSR_Update commands issued by other VBSR caches 234 (block 412). As indicated at block 416, the target VBSR line, as updated by the data fields 276 of any merged VBSR_Update commands, is then placed in VBSR cache array 236, and VBSR controller 238 updates the corresponding entry in directory 240 to the Tb state. The process then passes to block 420.

Block 420 illustrates VBSR controller 238 locking the target VBSR line in VBSR cache array 236 to temporarily inhibit eviction of the target VBSR line from the VBSR cache 234 to ensure that the update specified by the VBSR store request of the processor core 200 is made in at least the associated VBSR cache array 236. While the target VBSR line is locked, VBSR controller 238 broadcasts a VBSR_Update command in an address tenure on the interconnect fabric, with data fields 276a-276b indicating the updated value of the target VBSR line (block 422). As described further below with reference to FIG. 5, the VBSR_Update command causes a non-blocking update to be performed on every valid cached copy of the target VBSR line throughout data processing system 100 so that all valid cached copies of the target VBSR line are synchronized. After the VBSR_Update command is completed, VBSR controller 238 unlocks the target VBSR line (block 424). The process depicted in FIG. 4 then terminates at block 426.

Figure 5:
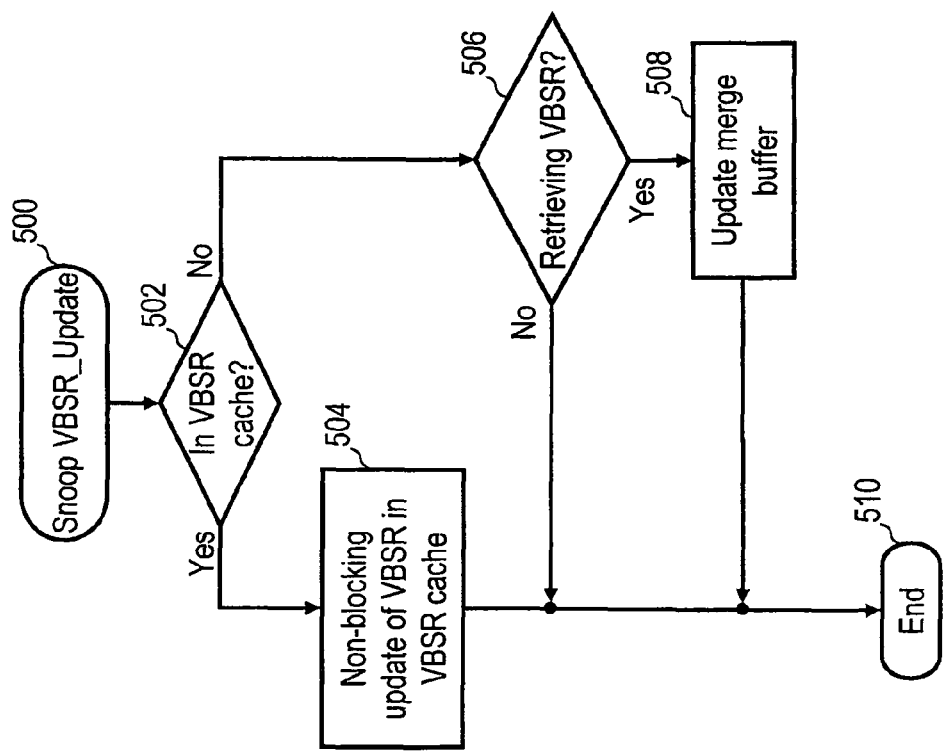
FIG. 5 is a high level logical flowchart of an exemplary process by which a VBSR cache 234 responds to a snooped VBSR_Update command.

With reference now to FIG. 5, there is illustrated a high level logical flowchart of an exemplary process by which each VBSR cache 234 in data processing system 100 responds to a snooped VBSR_Update command issued by a VBSR cache 234, for example, at block 422 of FIG. 4. The process begins at block 500 in response to a VBSR controller 238 snooping a VBSR_Update command on its local interconnect 214. In response to snooping the VBSR_Update command, VBSR controller 238 determines by reference to directory 240 whether or not the associated VBSR cache array 236 contains a valid copy of the target VBSR line of the snooped VBSR_Update command (block 502). If so, VBSR cache 234 simply performs a non-blocking update of the copy of the target VBSR line in VBSR cache array 236 utilizing the contents of data fields 276a-276b in the VBSR_Update command (block 504). Thereafter, the process terminates at block 510.

Returning to block 502, in response to a determination that the VBSR_Update command misses in directory 240, a determination is made at block 506 whether or not the target VBSR line is in the process of being retrieved by a VBSR_Get command into buffer 244. If not, the process terminates at block 510. However, in response to an affirmative determination at block 506, merge logic 246 merges into merge buffer 244 the changes to the target VBSR line reflected in data fields 276a-276b of the address tenure of VBSR_Update command (block 508). Thereafter, the process depicted in FIG. 5 terminates at block 510.

Figure 6:
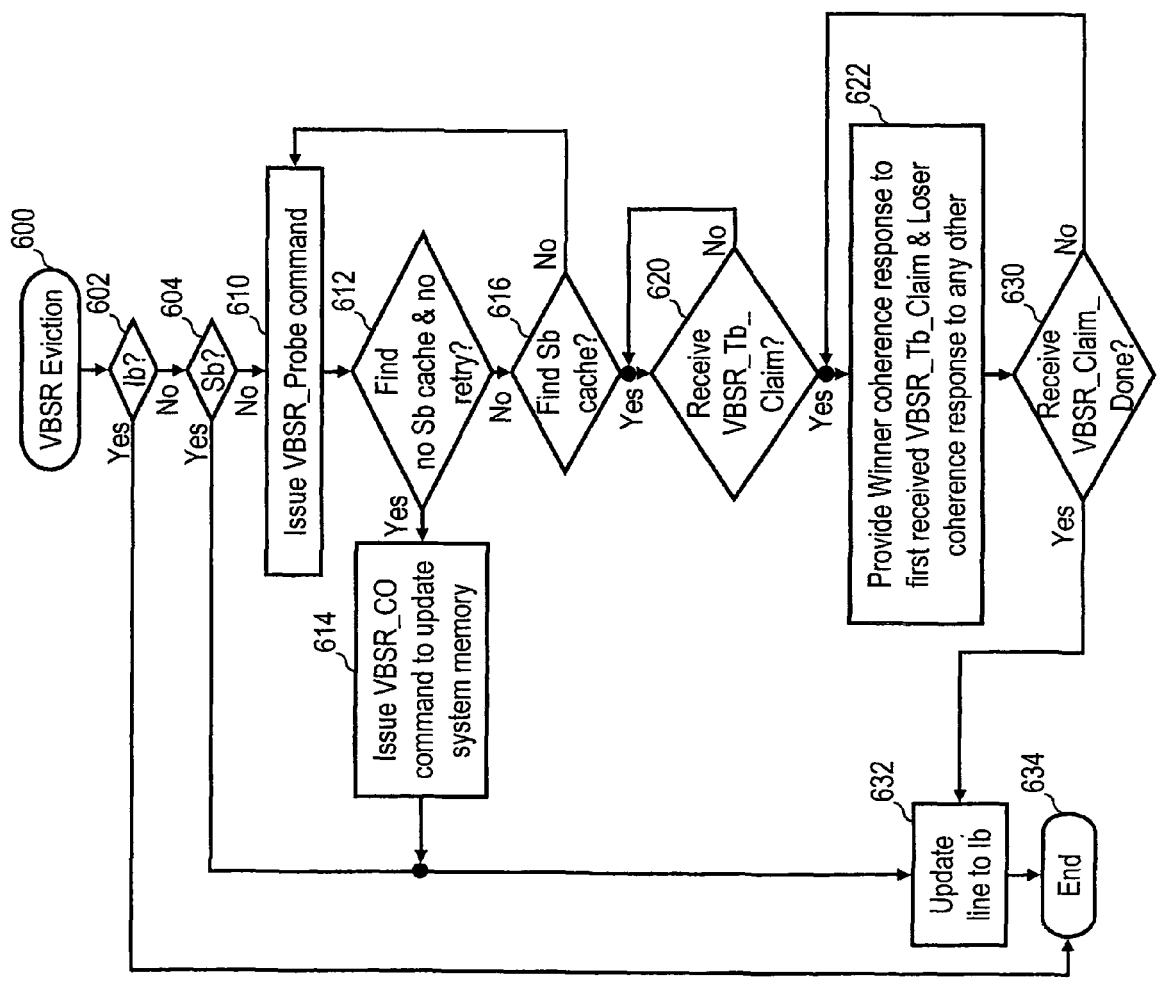
FIG. 6 is a high level logical flowchart of an exemplary process by which a VBSR cache 234 performs a VBSR eviction.

Referring now to FIG. 6, there is depicted a high level logical flowchart of an exemplary process by which a VBSR cache 234 performs a VBSR eviction. The process begins at block 600 in response to a need to evict a VBSR line, for example, as described at block 304 of FIG. 3 and block 404 of FIG. 4. The process proceeds from block 600 to blocks 602-604, which depicts VBSR controller 238 determining the coherence state of the victim VBSR line selected for eviction by reference to directory 240. If a determination is made at block 602 that the coherence state of the victim VBSR line is Ib, the VBSR eviction process simply terminates at block 634 since the VBSR cache 234 does not hold a valid copy of the victim VBSR line. If a determination is made at block 604 that the coherence state of the victim VBSR line is Sb, VBSR controller 238 simply invalidates the victim VBSR line by updating the associated coherence state in directory 240 to Ib (block 632). Thereafter, the VBSR eviction process ends at block 634.

Returning to blocks 602-604, in response to a determination that the coherence state of the victim VBSR line is Tb, meaning that VBSR cache 234 currently has the responsibility for writing back the victim VBSR line to VBSR region 250 of system memory 108 and for sourcing a copy of the VBSR line in response to a VBSR_Get command, the process proceeds to block 610. Block 610 depicts VBSR controller 238 issuing a VBSR_Probe command during an address tenure on its local interconnect 114. The VBSR_Probe command announces an election in an attempt to transfer the responsibilities for writing back the victim VBSR line and for sourcing a copy of the VBSR line to another VBSR cache 234, if any, holding a valid copy of the victim VBSR line.

Following block 610, VBSR controller 238 examines the coherence responses to the VBSR_Probe command, as depicted at blocks 612 and 616. At block 612, VBSR controller 238 determines if the coherence response to the VBSR_Probe command indicates that no other VBSR cache 234 holds a valid copy of the victim VBSR line and that no retry response indicating that a VBSR cache 234 could not service the VBSR_Probe command was received. In response to an affirmative determination at block 612, meaning that there is no other VBSR cache 234 to which responsibility for writeback of the victim VBSR line and for sourcing a copy of the VBSR line can be transferred, VBSR controller 238 issues a VBSR_CO command in an address tenure on local interconnect 114 to writeback the victim VBSR line to VBSR region 250 of system memory 108 (block 614). As discussed above, the VBSR_CO command causes the VBSR in system memory 108 to be updated. Thereafter, VBSR controller 238 updates the state of the victim VBSR line to Ib in directory 240 (block 632), and the process terminates at block 634.

Returning to block 612, in response to a negative determination at block 612, the process proceeds to block 616, which illustrates that VBSR controller 238 determining if the coherence response to the VBSR_Probe command indicates that at least one other VBSR cache 234 holds the victim VBSR line in the Sb state. If so, the process proceeds to block 620, which is described below. If, however, no other VBSR cache 234 holding the victim VBSR line in the Sb state is found, the process returns to block 610, illustrating VBSR controller 238 reissuing the VBSR_Probe command.

Block 620 depicts VBSR controller 238 waiting until at least one VBSR_Tb_Claim command is received from a snooping VBSR cache 234 holding the victim VBSR line in the Sb state. In response to receipt of the first VBSR_Tb_Claim command, the VBSR cache 234 initiating the election provides a winning coherence response indicating the outcome of the election. In one embodiment, the winning coherence response indicates that the VBSR cache 234 that was the source of the first received VBSR_Tb_Claim command is the winner of the election and that other VBSR cache(s) 234, if any, that provided a VBSR_Tb_Claim command are losers of the election (block 622). As indicated at block 630, the VBSR cache 234 initiating the election then awaits receipt of a VBSR_Claim_Done command from the winner of the election acknowledging receipt of the Winning coherence response confirming assumption of responsibility for writeback of the victim VBSR line and for sourcing a copy of the victim VBSR line and confirming that all losing VBSR caches 234 participating in the election have ceased to issue VBSR_Tb_Claim commands. In response to receipt of the VBSR_Claim_Done command, the VBSR controller 238 that initiated the election then updates the coherence state of the victim VBSR line in directory 240 to Ib (block 632). Thereafter, the VBSR eviction process terminates at block 634.

Figure 7:
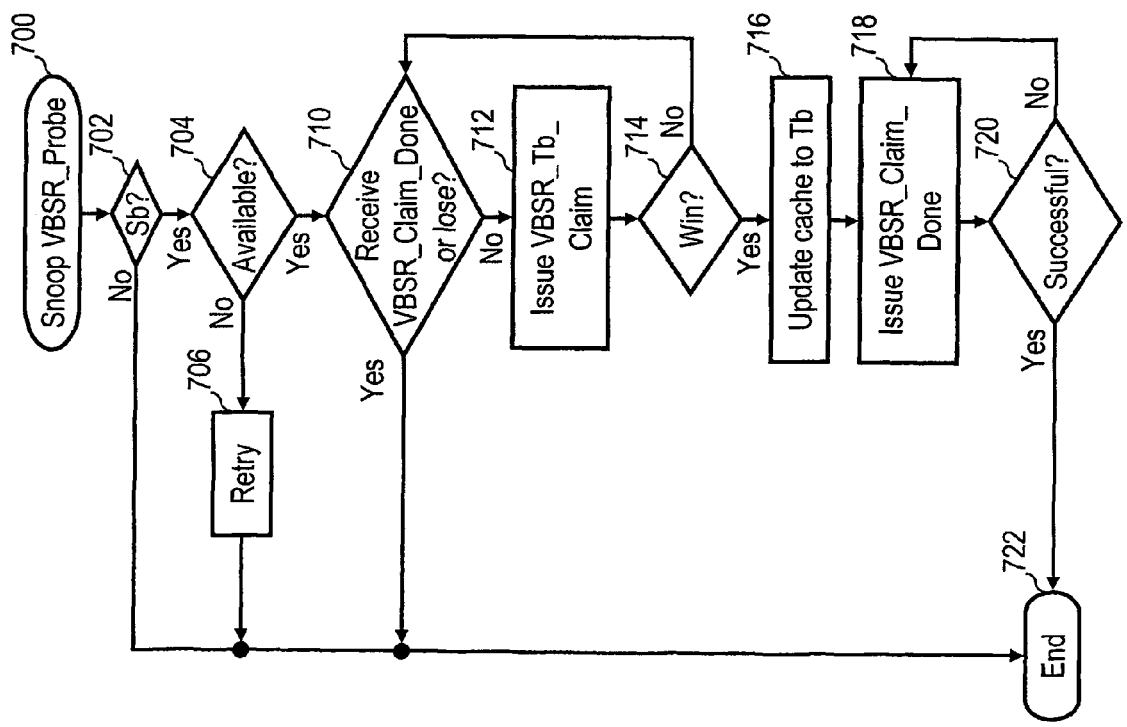
FIG. 7 is a high level logical flowchart of an exemplary process by which a VBSR cache 234 responds to a snooped VBSR_Probe command announcing an election.

With reference now to FIG. 7, there is illustrated a high level logical flowchart of an exemplary process by which each VBSR cache 234 in data processing system 100 responds to a snooped VBSR_Probe command. The process begins at block 700 in response to a VBSR cache 234 snooping a VBSR_Probe command on its local interconnect 114. In response to snooping the VBSR_Probe command, VBSR controller 238 determines if the victim VBSR line identified by the address field 278 of the VBSR_Probe command is in a valid (e.g., Sb) state in the directory 240 of the snooping VBSR cache 234. If not, the VBSR cache 234 is not a candidate for election as the next Tb cache, and the process accordingly terminates at block 722.

If, however, VBSR controller 238 determines at block 702 that the victim VBSR line is in a valid (e.g., Sb) state in directory 240, VBSR controller 238 determines whether it currently has resources available to participate in the election (block 704). If not, the VBSR controller 238 provides a retry coherence response to the VBSR_Probe command to cause the VBSR_Probe command to be reissued (block 706). If, however, VBSR controller 238 has resources available to participate in the election process, VBSR controller 238 determines at block 710 whether it has received a VBSR_Claim_Done command or a losing coherence response indicating that the snooping VBSR cache 234 is not the winner of the election. If so, the process simply terminates at block 722.

Referring again to block 710, in response to a determination that the VBSR controller 238 has not received a VBSR_Claim_Done command or a losing coherence response indicating the VBSR cache 234 is a loser of the election, VBSR controller 238 transmits a VBSR_Tb_Claim command during an address tenure on its local interconnect 114 to indicate that the snooping VBSR cache 234 is available to assume writeback responsibility for the victim VBSR line. As indicated at block 714, the process iterates through blocks 710-714 until the snooping VBSR cache 234 is identified as the winner of the election in a Winning coherence response, in which case the process passes from block 714 to block 716, or is indicated as being a loser of the election by a losing coherence response or a VBSR_Claim_Done command (in which case the process terminates at block 722).

At block 716, VBSR controller 238 updates the coherence state of the copy of the victim VBSR line in its directory 240 from the Sb state to the Tb state. VBSR controller 238 then issues a VBSR_Claim_Done command during an address tenure on its local interconnect 114 to signify assumption by the snooping VBSR cache 234 of the responsibility to writeback the victim VBSR line to VBSR region 250 of system memory 108, to ensure that all losing VBSR caches 234 participating in the election cease to issue VBSR_Tb_Claim commands, and to release the former Tb cache (block 718). As indicated by block 720, VBSR controller 238 reissues the VBSR_Claim_Done command until a successful coherence response is received indicating receipt of the VBSR_Claim_Done command by the VBSR cache 234 that initiated the election by issuing the VBSR_Probe command. Thereafter, the process terminates at block 722.

As has been described, in one embodiment, a data processing system includes a system memory having a virtual barrier synchronization region allocated to storage of virtual barrier synchronization registers (VBSRs). A plurality of processing units is operable to access the virtual barrier synchronization region of the system memory, and each includes a processor core and a VBSR cache. The VBSR cache includes a cache array that caches VBSR lines from the virtual barrier synchronization region of the system memory and a cache controller that, responsive to a store request from the processor core to update a particular VBSR line, performs a non-blocking update of the cache array in each other of the plurality of processing units contemporaneously holding a copy of the particular VBSR line by transmitting a VBSR update command on the interconnect fabric. In a preferred embodiment, the VBSR update command includes an address tenure, but no data tenure.

In one embodiment, a data processing system includes a system memory having a virtual barrier synchronization region allocated to storage of virtual barrier synchronization registers (VBSRs). A plurality of processing units is operable to access the virtual barrier synchronization region of the system memory, and each includes a processor core and a VBSR cache. The VBSR cache includes a cache array that caches VBSR lines from the virtual barrier synchronization region of the system memory and a cache controller that, responsive to a memory access request from the processor core of the first processing unit that targets a first VBSR line, transfers responsibility for writing back to the virtual barrier synchronization region a second VBSR line contemporaneously held in the cache arrays of all of the first, second and third processing units to one of the second and third processing units via an election held over the interconnect fabric.

While various embodiments have been particularly shown as described with reference to a preferred embodiment, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a storage medium storing program code that can be processed by a data processing system.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A data processing system, comprising:
an interconnect fabric;
a system memory coupled to the interconnect fabric and including a virtual barrier synchronization region allocated to storage of virtual barrier synchronization registers (VBSRs);

a plurality of processing units coupled to the interconnect fabric and operable to access the virtual barrier synchronization region, wherein the plurality of processing units includes at least first, second and third processing units and each of the plurality of processing units includes:
  a processor core; and
  a cache memory coupled to the processor core, said cache memory including a cache controller and a cache array that caches VBSR lines from the virtual barrier synchronization region of the system memory;
wherein the cache controller of the first processing unit, responsive to a memory access request from the processor core of the first processing unit that targets a first VBSR line, transfers responsibility for writing back to the virtual barrier synchronization region a second VBSR line contemporaneously held in the cache arrays of all of the first, second and third processing units to one of the second and third processing units via an election held over the interconnect fabric.

2. The data processing system of claim 1, wherein:
the cache controller of the first processing unit is a first cache controller, the cache controller of the second processing unit is a second cache controller and the cache controller of the third processing unit is a third cache controller;
the first cache controller initiates the election by transmitting a probe command on the interconnect fabric;
responsive to receipt via the interconnect fabric of a response to the probe command from one or more of the first and second cache controllers, the first cache controller determines an outcome of the election and transmits an election outcome message on the interconnect fabric indicating the outcome of the election.

3. The data processing system of claim 2, wherein:
said election outcome message identifies a single one of the second and third cache controllers as a winner of the election; and
responsive to being identified as the winner in the election outcome message, one of the second and third cache controllers updating a coherence state associated with the second VBSR line to indicate responsibility for writing back the second VBSR line to the virtual barrier synchronization region of system memory.

4. The data processing system of claim 3, wherein responsive to the election outcome message, the single one of the second and third cache controllers identified as the winner transmits a claim done message on the interconnect fabric to indicate assumption of responsibility to write back the second VBSR line to the virtual barrier synchronization region of system memory.

5. The data processing system of claim 1, wherein:
the memory access request is a store request; and
the cache controller of the first processing unit, responsive to the store request, performs a non-blocking update of the cache array in each other of the plurality of processing units holding a copy of the first VBSR line by transmitting a VBSR update command on the interconnect fabric.

6. A processing unit for a data processing system including an interconnect fabric, a system memory coupled to the interconnect fabric and including a virtual barrier synchronization region allocated to storage of virtual barrier synchronization registers (VBSRs), and a plurality of processing units coupled to the interconnect fabric and operable to access the virtual barrier synchronization region, wherein the processing unit is a first processing unit among the plurality of processing units and the plurality of processing units further includes at least second and third processing units, wherein the first processing unit comprises:
  a processor core; and
  a cache memory coupled to the processor core, said cache memory including a cache controller and a cache array that caches VBSR lines from the virtual barrier synchronization region of the system memory;
wherein the cache controller of the first processing unit, responsive to a memory access request from the processor core of the first processing unit that targets a first VBSR line, transfers responsibility for writing back to the virtual barrier synchronization region a second VBSR line contemporaneously held in the cache arrays of all of the first, second and third processing units to one of the second and third processing units via an election held over the interconnect fabric.

7. The processing unit of claim 6, wherein:
the cache controller of the first processing unit is a first cache controller, the cache controller of the second processing unit is a second cache controller and the cache controller of the third processing unit is a third cache controller;
the first cache controller initiates the election by transmitting a probe command on the interconnect fabric;
responsive to receipt via the interconnect fabric of a response to the probe command from one or more of the first and second cache controllers, the first cache controller determines an outcome of the election and transmits an election outcome message on the interconnect fabric indicating the outcome of the election.

8. The processing unit of claim 7, wherein:
said election outcome message identifies a single one of the second and third cache controllers as a winner of the election and thereafter responsible for writing back the second VBSR line to the virtual barrier synchronization region of system memory.

9. The processing unit of claim 8, wherein responsive to receipt of a claim done message by which the winner acknowledges the election outcome message, the first cache controller invalidates its copy of the second VBSR line.

10. The processing unit of claim 6, wherein:
the memory access request is a store request; and
the cache controller of the first processing unit, responsive to the store request, performs a non-blocking update of the cache array in each other of the plurality of processing units holding a copy of the first VBSR line by transmitting a VBSR update command on the interconnect fabric.

11. The processing unit of claim 6, wherein the processing unit is a single integrated circuit.

12. A method of data processing in a data processing system including an interconnect fabric, a system memory coupled to the interconnect fabric and including a virtual barrier synchronization region allocated to storage of virtual barrier synchronization registers (VBSRs), and a plurality of processing units coupled to the interconnect fabric and operable to access the virtual barrier synchronization region, wherein the plurality of processing units includes at least first, second, and third processing units having first, second and third cache memories, respectively, said method comprising:
  the first, second and third cache memories caching a plurality of VBSR lines from the virtual barrier synchronization region of the system memory, said caching including holding copies of a second VBSR line contemporaneously in all of the first, second and third cache memories;

recording an indication in the first cache memory that the first cache memory is uniquely responsible for writing back the second VBSR line to the virtual barrier synchronization region of the system memory;

the first cache memory, responsive to a memory access request from the processor core of the first processing unit that targets a first VBSR line, transferring responsibility for writing back the second VBSR line to the virtual barrier synchronization region to one of the second and third cache memories by conducting an election held over the interconnect fabric; and following the election, removing the indication in the first cache memory and recording an indication of responsibility for writing back the second VBSR line in one of the second and third cache memories identified as a winner of the election.

13. The method of claim 12, wherein the transferring comprises:

the first cache memory initiating the election by transmitting a probe command on the interconnect fabric;

responsive to receipt via the interconnect fabric of a response to the probe command from one or more of the first and second cache controllers, the first cache memory determining an outcome of the election and transmitting an election outcome message on the interconnect fabric indicating the winner of the election.

14. The method of claim 13, wherein responsive to receipt of a claim done message by which the winner acknowledges the election outcome message, the first cache memory invalidates its copy of the second VBSR line.

15. The processing unit of claim 12, wherein:

the memory access request is a store request; and the first cache memory, responsive to the store request, performs a non-blocking update of the cache memory in each other of the plurality of processing units holding a copy of the first VBSR line by transmitting a VBSR update command on the interconnect fabric.

* * * * *